United States Patent [19]

McCallister

[11] Patent Number: 6,041,088
[45] Date of Patent: Mar. 21, 2000

[54] RAPID SYNCHRONIZATION FOR COMMUNICATION SYSTEMS

[75] Inventor: Ronald D. McCallister, Scottsdale, Ariz.

[73] Assignee: Sicom, Inc., Scottsdale, Ariz.

[21] Appl. No.: 09/095,357

[22] Filed: Jun. 10, 1998

Related U.S. Application Data

[63] Continuation-in-part of application No. 08/740,016, Oct. 23, 1996.

[51] Int. Cl.[7] .................................................... H04L 7/00
[52] U.S. Cl. ........................... 375/358; 375/356; 370/324
[58] Field of Search ..................................... 375/354, 358, 375/356; 370/324, 350; 455/502, 71, 62, 69

[56] References Cited

U.S. PATENT DOCUMENTS

| | | |
|---|---|---|
| 4,006,477 | 2/1977 | Yost, Jr. et al. . |
| 4,218,680 | 8/1980 | Kennedy . |
| 4,489,413 | 12/1984 | Richmond et al. . |
| 4,513,447 | 4/1985 | Carson ....................................... 455/76 |
| 4,704,582 | 11/1987 | Dixon et al. . |
| 4,932,070 | 6/1990 | Waters et al. .............................. 455/10 |
| 5,115,515 | 5/1992 | Yamamoto et al. ....................... 455/71 |
| 5,134,707 | 7/1992 | Sakashita et al. ........................ 455/3.2 |
| 5,212,831 | 5/1993 | Chuang et al. . |
| 5,230,088 | 7/1993 | Kramer, Jr. et al. ...................... 455/76 |
| 5,241,688 | 8/1993 | Arora . |
| 5,249,305 | 9/1993 | Wieczorek et al. ..................... 455/54.2 |
| 5,280,644 | 1/1994 | Vannatta et al. ......................... 455/265 |
| 5,377,232 | 12/1994 | Davidov et al. . |
| 5,390,216 | 2/1995 | Bilitza et al. . |
| 5,509,034 | 4/1996 | Beukema ................................. 375/344 |
| 5,528,597 | 6/1996 | Gerszberg et al. .................... 370/95.3 |
| 5,542,095 | 7/1996 | Petranovich .............................. 455/76 |
| 5,550,992 | 8/1996 | Hashimoto .............................. 375/355 |
| 5,671,257 | 9/1997 | Cochran et al. ........................ 375/355 |
| 5,794,119 | 8/1998 | Evans et al. ............................. 455/6.2 |
| 5,818,832 | 10/1998 | McCallister ............................ 370/350 |

OTHER PUBLICATIONS

"Telecommunication Systems Engineering" by William C. Lindsey, Marvin K. Simon published by Prentice–Hall, Inc. pp 86–87.

(List continued on next page.)

*Primary Examiner*—Stephen Chin
*Assistant Examiner*—Lenny Jiang
*Attorney, Agent, or Firm*—Meschkow & Gresham, P.L.C.; Lowell W. Gresham

[57] ABSTRACT

Different subscriber units (14) transmit different burst signals to a base station (12) on a common frequency to which a base station demodulator (64) is already synchronized. The base station (12) transmits constant values α and η, where α is multiplied by a base station reference frequency to achieve a base station transmitting frequency, and η is multiplied by the reference frequency to achieve the base station (12) receiving frequency. A subscriber unit (14) synchronizes to the base station transmitting frequency. As a result of the synchronization process, the subscriber unit (14) determines a value μ, which, when multiplied by a subscriber unit reference frequency, achieves the subscriber unit synchronization frequency. The subscriber unit then determines a value γ, which is proportional to η and β and inversely proportional to α. The subscriber unit reference frequency is multiplied by γ to achieve the frequency at which the subscriber unit (14) transmits.

24 Claims, 5 Drawing Sheets

OTHER PUBLICATIONS

"A Consideration of VCO and Thermal Phase Noise in a Coherent Two–Way Doppler Communication System" by Jack K. Holmes, published in IEEE Transactions on Space Electronics and Telemetry in March 1965 pp 1–6.

"Phase Coherency in Tracking and Data Relay Satellites" by Robert M. Gagliardi published in IEEE Transactions and Communications, vol. COM27 No. 10 Oct. 1979, pp1527–1537.

"The Theory, Design, and Operation of the Suppressed Carrier Data–Aided Tracking Receiver" by M.K. Simon J.C. Springett, published by Jet Propulsion Laboratory California Institute of Technology, pp 56–61.

"TDRSS Telecommunications Payload: An Overview" by H.B. Poza published by TRW Defense and Space Systems Group, pp. 19:1–1—19:1–7.

H. Meyr, M. Oerder, and A. Polydoros, On Sampling Rate, Analog Prefiltering, and Sufficient Statistics for Digital Receivers, IEEE Transactions on Communications, vol. 42, No. 12, Dec. 1994, pp. 3208–3214.

W. G. Cowley and L. P. Sabel, The Performance of Two Symbol Timing Recovery Algorithms for PSK Demodulators, IEEE 1994.

M. P. Fitz and W. C. Lindsey, Decision–Directed Burst–Mode Carrier Synchronization Techniques, IEEE Transactions on Communcations, vol. 40, No. 10, Oct. 1992, pp. 1644–1653.

K. H. Mueller and M. Müller, Timing Recovery in Digital Synchronous Data Receivers, IEEE Transactions on Communications, vol. COM–24, No. 5, May 1976, pp. 516–531.

RAPID SYNCHRONIZATION FOR COMMUNICATION SYSTEMS

RELATED PATENTS

This is a Continuation-In-Part of "Rapid Synchronization For Communication Systems," by Ronald D. McCallister, filed Oct. 23, 1996, Ser. No. 08/740,016, which is incorporated herein by reference.

TECHNICAL FIELD OF THE INVENTION

The present invention relates generally to communication systems in which a common base station or cell site engages in two-way communication with a plurality of subscriber units. More specifically, the present invention relates to quickly synchronizing the base station to signals received from the subscriber units.

BACKGROUND OF THE INVENTION

In many radio communication systems, such as local multipoint distribution systems (LMDS), point to multipoint systems or time division multiple access (TDMA) burst systems, a number of independent subscriber unit data transmitting and receiving stations have access to a single base station. Subscriber unit transmissions are managed on a time-division basis such that the available base station time is allocated among the subscriber units in some manner. The performance of these systems depends to a large degree on the efficiency with which the functions of rapid synchronization and demodulation are performed.

With conventional burst mode communications, there is the problem of frequency synchronization of the base station receiver to the subscriber unit's return channel. The problem is caused, at least in part, by noise or other uncertainty concerning the received signal's frequency. The received signal uncertainty causes the base station to spend an excessive amount of time synchronizing before the base station can successfully extract data from the received signal. Excessive synchronization or acquisition time translates into low operating efficiencies. Such low operating efficiencies are exacerbated in burst mode communication systems because the synchronization time is repeated for each burst. Systems having a larger number of brief transmission bursts are less efficient than systems which accommodate a smaller number of longer bursts due to the overhead time to synchronize to the greater number of bursts.

In digital communication systems, at least two diverse types of frequency synchronization are conventionally performed in receivers. Carrier synchronization refers to a process wherein a frequency of a receiver oscillator is adjusted, typically using a voltage controlled oscillator (VCO) within a feedback loop located in the receiver, to match the frequency of a received signal, either in RF or IF form. Baud synchronization, also called bit synchronization, bit timing, and the like, refers to a process for adjusting a different oscillator to determine the baud of data conveyed by a received signal. Baud synchronization is conventionally performed using a feedback loop located in the receiver. In a typical digital communication system, carrier synchronization is achieved before baud synchronization can be achieved. Both types of synchronization is achieved before data is successfully demodulated.

In each of these two types of frequency synchronization, the further the frequency of the received signal is offset from the initial frequency of the receiver's internal oscillator, the longer the synchronization process takes. In addition, variable frequency oscillators, such as VCOs, introduce phase noise. When feedback loops attempt to track signals exhibiting large phase and thermal noise, an undesirable compromise is reached between narrow and wide loop bandwidths. A narrow loop bandwidth may reduce the noise-induced degradation and achieve the lowest possible bit error rates, but synchronization times increase as bandwidth decreases and tracking is doubtful. A wide loop bandwidth may successfully track large amounts of phase noise and quickly synchronize, but a portion of the phase noise passes through and increases bit error rates.

It will be appreciated from the foregoing that there has been a need for an improved method of synchronization in radio communication systems.

SUMMARY OF THE INVENTION

Accordingly, it is an advantage of the present invention that an improved method and apparatus for achieving rapid synchronization in a communication system is provided.

Another advantage of the present invention allows rapid synchronization of a subscriber unit transmit signal to a base station receiver.

Another advantage of the present invention is that subscriber units adjust their carrier and/or baud oscillators so that little or no synchronization or acquisition is required at the base station.

Another advantage of the present invention is that phase noise in transmit signals is reduced through the use of stable rather than variable oscillators.

In accordance with the above and other and advantages, the present invention is carried out in one form by a method for rapid frequency synchronization of a reverse channel signal to a base station receiving frequency. The base station receiving frequency is proportional to $\eta$ (eta) times a base station reference frequency, where $\eta$ is a first value. The method calls for transmitting a forward channel signal from a base station. The forward channel signal exhibits a base station transmitting frequency which is proportional to $\alpha$ (alpha) times the base station reference frequency, where $\alpha$ is a second value. A frequency multiplicand is calculated at the subscriber unit. This frequency multiplicand is proportional to $\eta$ and inversely proportional to $\alpha$. A subscriber unit transmitting frequency is generated in response to the frequency multiplicand, and the reverse channel signal is transmitted from the subscriber unit. The reverse channel signal exhibits the subscriber unit transmitting frequency.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
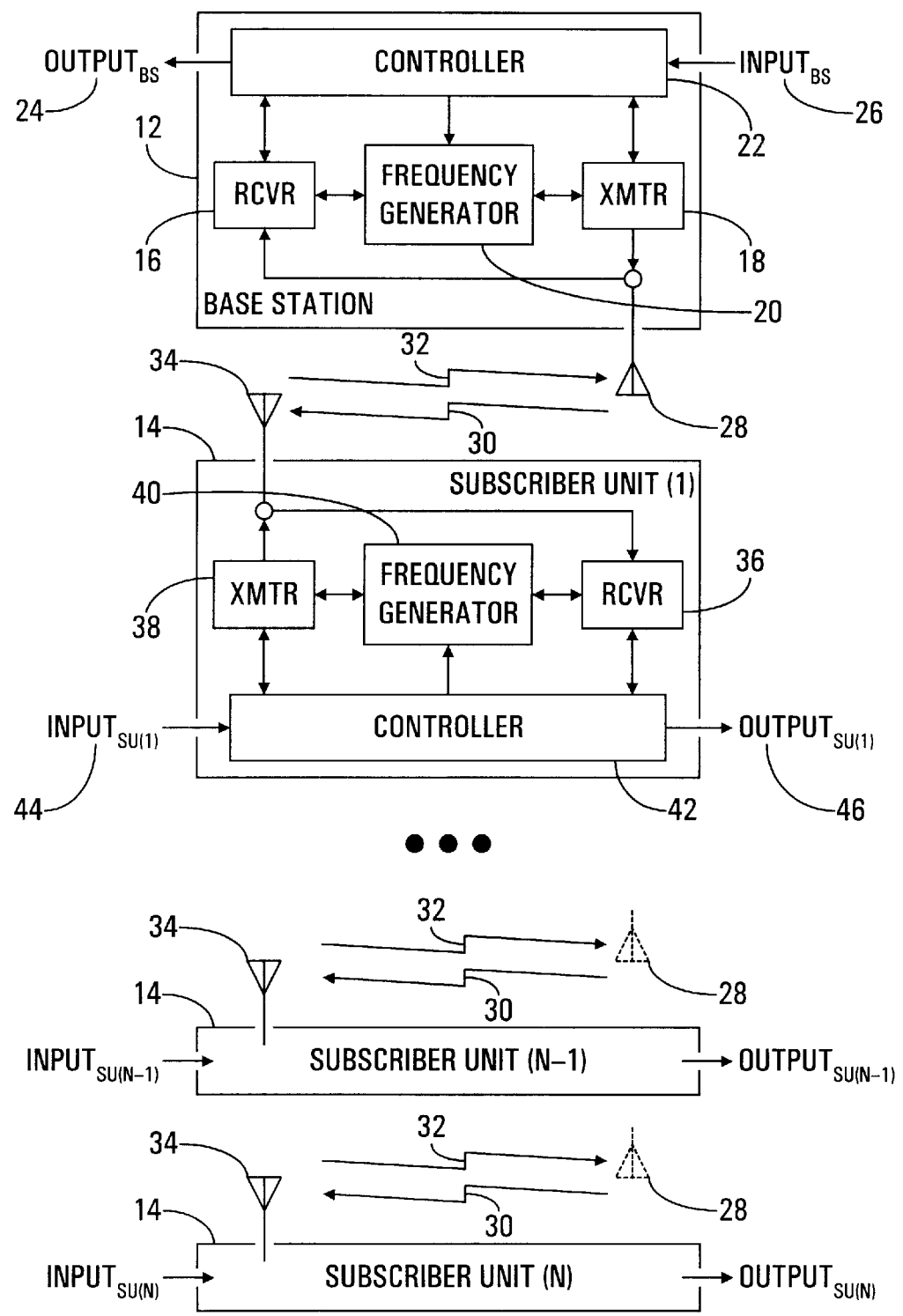
FIG. 1 shows a block diagram of a radio communication system configured in accordance with the present invention.

FIG. 1 shows a block diagram of a communication system 10. System 10 includes at least one hub, hereinafter referred to as a base station 12, and any number of customer premises equipment, hereinafter referred to as subscriber units 14. Subscriber units 14 are geographically separated from base station 12 and from each other. In the preferred embodiments, base station 12 and subscriber units 14 are located within a few miles of each other, but different subscriber units 14 are located different distances from base station 12. In the preferred embodiments, Doppler is not a significant concern because base station 12 and subscriber units 14 are substantially stationary relative to each other.

Base station 12 includes a receiver 16, a transmitter 18, a frequency generator 20, and a controller 22. Receiver 16 and transmitter 18 couple to frequency generator 20 and to controller 22. Likewise, frequency generator 20 couples to controller 22. Data may pass through an output data port 24 and an input data port 26 of base station 12 to and from a data network (not shown), such as a public switched telecommunications network. Under the control of controller 22, data from data network input port 26 is routed to transmitter 18 and data from receiver 16 is routed to data network output port 24. In addition, controller 22 operates in conjunction with receiver 16 and transmitter 18 to measure the quality of signals received at base station 12, assign communications capacity or bandwidth to calls, establish modulation orders at which to communicate with subscriber units 14, and perform call setup processes.

Base station 12 transmits an outgoing signal from an antenna 28 over a forward RF channel 30 away from base station 12. FIG. 1 shows phantom duplicate antennas 28 for drawing convenience, but duplicate antennas 28 are not a requirement. A reverse channel 32 conveys an incoming signal transmitted from a subscriber unit 14 to antenna 28 of base station 12. The terms forward channel and reverse channel are employed here only to distinguish one operation from the other. When a subscriber unit 14 transmits to base station 12, it is understood to be a reverse channel operation. When base station 12 transmits to a subscriber unit 14, it refers to a forward channel operation.

Any number of subscriber units 14 residing within radio range of base station 12 share forward channel 30 and have antennas 34 aimed to receive the forward channel signal. FIG. 1 shows block diagrammatic detail for only one of subscriber units 14 because each subscriber unit 14 is desirably configured like the other subscriber units 14. In particular, each subscriber unit 14 has a receiver 36 configured to receive the forward channel signal, a transmitter 38, a frequency generator 40, and a controller 42. Receiver 36 and transmitter 38 couple to frequency generator 40 and to controller 42. Frequency generator 40 also couples to controller 42.

As discussed in more detail below, receiver 36 generates coherence signals which couple to transmitter 38 through controller 42. These coherence signals cause reverse channel signals transmitted from various ones of subscriber units 14 in reverse channel 32 toward base station 12 to be temporally and spectrally coherent with the forward channel signals broadcast in forward channel 30.

For each subscriber unit 14, data passes through an input data port 44 and an output data port 46. Under the control of controller 42, data is routed from data port 44 to transmitter 38 and from receiver 36 to data port 46. In addition, controller 42 operates in conjunction with receiver 36 and transmitter 38 to configure messages transmitted on reverse channel 32 in response to the outgoing signal broadcast on forward channel 30, measure the quality of signals received at the subscriber unit 14, perform call setup processes, and engage in communication sessions.

In the preferred embodiment, system 10 conducts RF communications using an assigned wide bandwidth local multipoint distribution system spectrum. In the preferred embodiment, this spectrum may have a bandwidth up to 1 GHz or more and is positioned in or around the $K_a$ band. Those skilled in the art will appreciate that the wide bandwidth nature of this assigned spectrum permits the conveyance of vast amounts of data in short periods of time. System 10 is configured so that this bandwidth simultaneously accommodates high data rate applications, such as real time video or higher, and low data rate applications, such as voice. Moreover, system 10 is configured so that numerous simultaneous communication sessions, or calls, at both high and low data rates may efficiently take place. The use of the $K_a$ band takes advantage of the stationary relationship between base station 12 and subscriber units 14.

System 10 uses frequency and time diversity to simultaneously accommodate numerous calls. Frequency diversity is used so that nearby communications take place simultaneously at different frequencies without causing interference. Desirably, communications occur on forward and reverse channels 30 and 32 at different frequencies so that forward and reverse channels 30 and 32 are operated simultaneously without requiring significant overhead communications to manage bi-directional communications in a common frequency band.

Time diversity also prevents interference between simultaneous or concurrent communications. In particular, concurrent communications taking place between different subscriber units 14 operating at the same frequency do not interfere with one another because these subscriber units 14 engage in communication sessions using different sets of time slots allocated within timing frames. Desirably, all communications are digital RF communications. However, different communication sessions may be established to operate at different modulation orders. For example, concurrent communications may take place in which either 1 (e.g. BPSK), 2 (e.g. QPSK), 3 (e.g. 8-PSK), 4 (e.g. 16-PSK or 16-QAM), or more bits are conveyed per unit baud interval. Modulation order and time slot allocation are controlled by controller 22 to vary data rates from call to call and between different segments of communication sessions.

Figure 2:
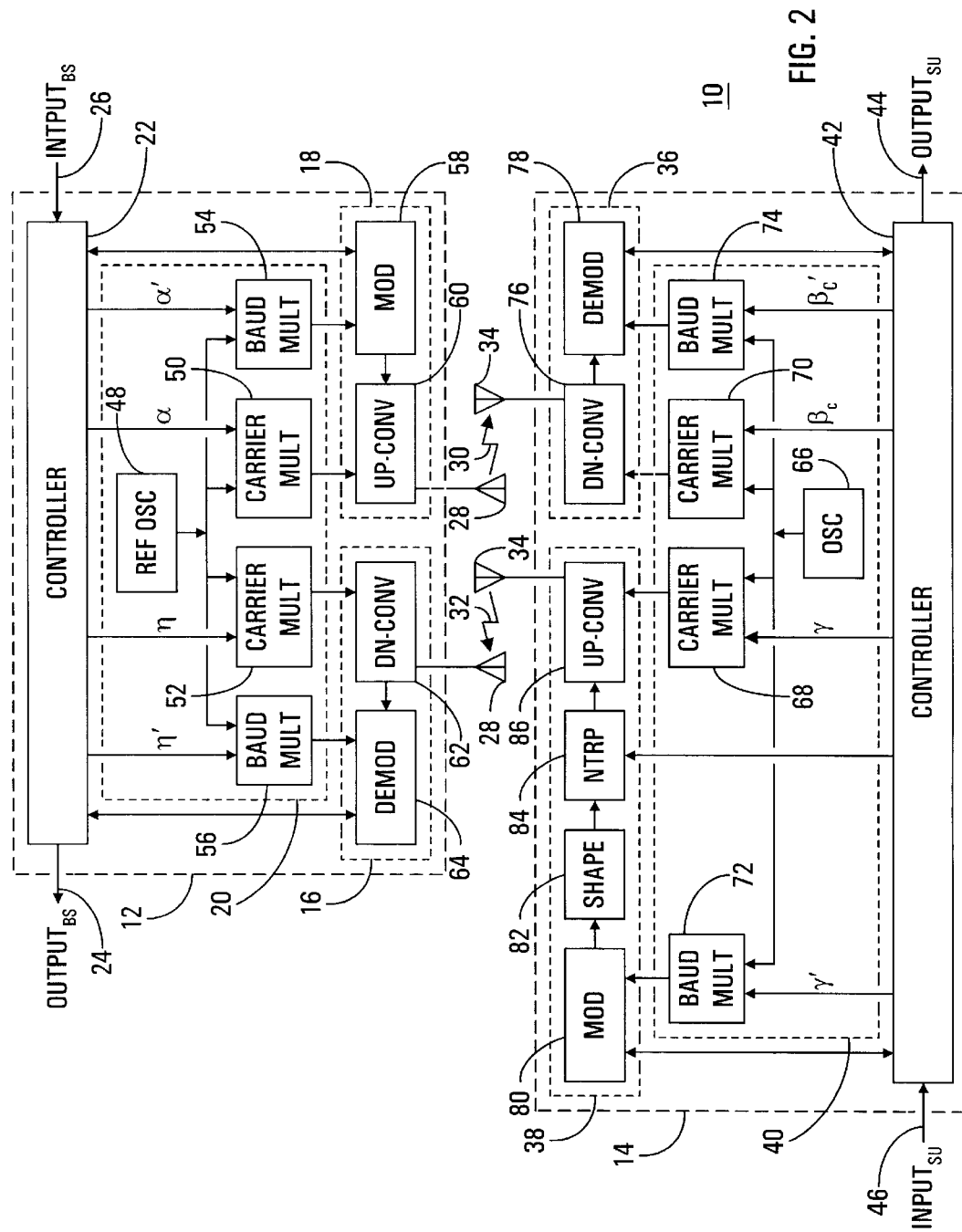
FIG. 2 is a simplified block diagram of a base station and subscriber unit included in the radio communication system in accordance with the present invention.

FIGS. 2 through 7 illustrate a preferred embodiment of radio communication system 10, which provides rapid synchronization of a subscriber unit transmitting frequency to a base station 12 receiving frequency. While FIG. 2 shows only one subscriber unit 14 for convenience, any number of subscriber units 14 may be associated with a base station 12, as discussed above.

FIG. 2 shows a block diagram of base station 12 and subscriber unit 14. A base station reference oscillator 48 is included in frequency generator 20 to provide a substantially stable base station reference frequency. In particular, oscillator 48 is desirably configured as a crystal controlled oscillator that oscillates at only a single frequency with minimal drift away from that single frequency in spite of voltage or temperature fluctuations and with minimal phase noise. Frequency generator 20 also includes a transmit carrier frequency multiplier 50, a receive carrier frequency multiplier 52, a transmit baud frequency multiplier 54, and a receive baud frequency multiplier 56.

In the preferred embodiment, an output of oscillator 48 couples to first inputs of each of frequency multipliers 50, 52, 54, and 56. However, in an alternate embodiment, baud frequency multipliers 54 and 56 may be driven from another stable reference oscillator (not shown) rather than oscillator 48. First, second, third, and fourth control outputs from controller 22 couple respectively to second inputs of each of frequency multipliers 50, 52, 54, and 56.

Each of multipliers 50, 52, 54, and 56 is configured to generate a stable oscillating signal which is the product of a multiplicand provided by controller 22 and a reference frequency provided by reference oscillator 48. The multiplicand is a substantially constant value which desirably does not change over the course of a given signal transmission. The stable oscillating signals exhibit very low phase noise because they are coherent with the reference frequency provided by oscillator 48. However, nothing requires the multiplicands to be provided by controller 22, and the multiplicands may alternatively be hard-wired. Those skilled in the art will appreciate that multipliers 50, 52, 54, and 56 are configured as needed to synthesize the respective stable oscillating signals so that they are coherent with the reference oscillator. Accordingly, the multiplicands may be any real number, either greater than, equal to, or less than one. Of course, if reference oscillator 48 is configured so that one of the stable oscillation signals generated by multipliers 50, 52, 54, or 56 has a frequency equal to the frequency of reference oscillator 48, then the frequency multiplier for that stable oscillation signal may be omitted.

Accordingly, frequency generator 20 generates four stable oscillation signals. The signal produced by transmit carrier frequency multiplier 50 defines the base station transmitting frequency. The signal produced by receive carrier frequency multiplier 52 defines the base station receiving frequency at which demodulation of the reverse channel 32 signal can occur. Those skilled in the art will appreciate that frequencies of the signals produced by transmit and receive carrier frequency multipliers 50 and 52 need not equal the RF carrier frequency, but may alternatively represent IF frequencies which are subsequently converted to RF using well-known techniques.

The signal produced by transmit baud frequency multiplier 54 defines the transmit baud frequency for base station 12, and the signal produced by receive baud frequency multiplier 56 defines the receive baud frequency for base station 12. The baud frequency, or simply baud, is the reciprocal of the unit interval. During each unit interval, system 10 communicates a single phase point that conveys a unit of data, wherein the unit of data includes a number of bits or symbols determined by the modulation order. With BPSK modulation a single symbol is communicated per unit interval, with QPSK modulation two symbols are communicated per unit interval, in 8-PSK modulation three symbols are communicated per unit interval, in 16-QAM, 32-QAM, and 64-QAM modulations four, five, and six symbols are communicated per unit interval, and so on.

Those skilled in the art will appreciate that the transmit and receive baud frequencies are significantly less than the transmit and receive carrier frequencies. Those skilled in the art will also appreciate that the four stable oscillation signals generated by frequency generator 20 allow transmit and receive carrier frequencies to differ from one another and transmit and receive baud frequencies to differ from one another. However, system 10 is not required to have transmit and receive baud frequencies differ.

Transmitter 18 includes a modulator 58 and an up-converter 60. An output of transmit carrier frequency multiplier 50 couples to a first input of up-converter 60. Controller 22 has a control bus that couples to modulator 58 and provides data to be transmitted in the forward channel 30 signal. This data may be generated within controller 22 for the purposes of controlling system 10 or obtained from input data port 26. The stable oscillation signal from transmit frequency baud multiplier 54 also couples to modulator 58 to define the transmit baud frequency. An output of modulator 58 couples to a first input up-converter 60. The stable oscillation signal from transmit frequency carrier oscillator 50 couples to a second input of up-converter 60 to define the base station transmitting frequency of the forward channel signal. An output of up-converter 60 couples to antenna 28. Of course, those skilled in the art will appreciate that multiplier 50 and up-converter 60 may alternatively be configured to cooperate with each other in multiple stages rather than in a single stage as shown in the block diagram of FIG. 2.

Up-converter 60 transmits an RF signal to antenna 28 that conveys the data routed to modulator 58 from controller 22. The data portion of this signal exhibits the transmit baud frequency and the carrier portion of this signal exhibits the base station transmitting frequency. The forward channel signal is generated when this signal is radiated from antenna 28 to subscriber unit 14.

Receiver 16 of base station 12 includes a down-converter 62 and a demodulator 64. An output of receive carrier frequency multiplier 52 couples to down-converter 62 to define the base station receiving frequency. Down-converter 62 also receives a signal from antenna 28. Although FIG. 2 shows base station 12 as having separate transmit and receive antennas 28, those skilled in the art will appreciate that a single antenna may suffice in many applications. An output of down-converter 62 couples to a first input of demodulator 64. An output of receive baud frequency multiplier 56 couples to a second input of demodulator 64 to define the receive baud frequency. As discussed in more detail below, the reverse channel signal is configured in subscriber unit 14 before transmission to substantially exhibit the base station receiving carrier frequency and the base station receiving baud frequency.

An output of demodulator 64 couples to an input of controller 22. In response to the reverse channel signal received by down-converter 62 at the base station receiving frequency, demodulator 64 extracts data conveyed by the reverse channel signal and passes this data to controller 22. This data may then be consumed by controller 22 for system overhead purposes or passed on through output data port 24.

Frequency generator 40 of subscriber unit 14 has a similar structure to frequency generator 20 of base station 12. Thus, a subscriber unit oscillator 66 is included in frequency generator 40 to provide a substantially stable subscriber unit reference frequency. Oscillator 66 is desirably a crystal controlled oscillator that varies minimally in response to temperature or voltage changes. Frequency generator 40 also includes a transmit carrier frequency multiplier 68, a receive carrier frequency multiplier 70, a transmit baud frequency multiplier 72, and a receive baud frequency multiplier 74.

Each of multipliers 68, 70, 72, and 74 is configured to generate a stable oscillating signal which is the product of a multiplicand provided by controller 42 and a reference frequency provided by reference oscillator 66. Multipliers 68, 70, 72, and 74 are configured as needed to synthesize the respective stable oscillating signals, and the multiplicands may be any real number, either greater than, equal to, or less than one. These multiplicands are desirably substantially constant values.

Accordingly, frequency generator 40 generates four stable oscillation signals. The signal produced by transmit carrier frequency multiplier 68 defines the subscriber unit carrier transmitting frequency. The signal produced by receive carrier frequency multiplier 70 provides a coarse or imprecise definition of the subscriber unit receiving carrier frequency. The signal produced by transmit baud frequency multiplier 72 defines the transmit baud frequency for subscriber unit 14, and the signal produced by receive baud frequency multiplier 74 provides a coarse or imprecise definition of the receive baud frequency, hereinafter called a sampling frequency $F_S$, for subscriber unit 14. As discussed in more detail below, fine or precise definitions of the receive carrier and baud frequencies are provided during the demodulation process which takes place in subscriber unit 14 as subscriber unit 14 synchronizes to the forward channel signal.

Within receiver 36, a down-converter 76 receives the forward channel signal from antenna 34. An output of receive carrier frequency multiplier 70 couples to down-converter 76. An output of down-converter 76 desirably provides a near-baseband signal and couples to a first input of a demodulator 78, and an output of receive baud frequency multiplier 74 couples to a second input of demodulator 78. This near-baseband signal is displaced in frequency from baseband by the difference between the carrier frequency of forward channel 30 and the frequency generated by receive carrier frequency multiplier 70. Of course, down-converter 76 may utilize a two-step process which first down-converts to an IF frequency before producing the near baseband signal.

Demodulator 78 extracts and provides the digital data conveyed by forward channel 30 and provides control signals over a data and control bus to controller 42. The control signals include the above-discussed coherence signals, which are determined in response to synchronizing subscriber unit 14 to the forward channel signal. Likewise, control signals are provided to demodulator 78 from controller 42 over this control and data bus. Demodulator 78 is discussed in more detail below in connection with FIG. 4.

Within transmitter 38, data to be transmitted over reverse channel 32 is provided to a first input of a modulator 80 from controller 42. This data may be passed through controller 42 from input data port 44 or generated within controller 42 for the purposes of controlling system 10. A subscriber unit transmit baud frequency is established by a clock signal from an output of subscriber unit transmit baud multiplier 72, which is supplied to a second input of modulator 80. Modulator 80 generates a new phase point datum per unit interval, where the unit interval is defined by the subscriber unit transmit baud frequency. Those skilled in the art of digital communications will appreciate that the phase point data are desirably configured as digital quadrature signals.

The phase point data stream is routed to a digital pulse shaper 82. In the preferred embodiment, pulse shaper 82 filters the phase point data using an appropriate filtering function, such as the well-known root Nyquist function, to spread each unit interval's phase point in time so that reverse channel 32 exhibits a desirably narrow bandwidth.

An output of pulse shaper 82 provides a digital quadrature signal, which represents pulse-shaped, phase point data, that is routed to a first input of a digital interpolator (NTRP) 84. A second input of interpolator 84 receives control signals from controller 42. Interpolator 84 is configured to selectively delay the pulse-shaped, phase point data by an amount established through the control data received from controller 42.

An output of interpolator 84 provides a digital quadrature signal that is supplied to a first input of an up-converter 86. A second input of up-converter 86 receives the transmit carrier frequency signal from subscriber unit transmit carrier frequency multiplier 68. Up-converter 86 converts the digital quadrature signal from interpolator 84 into an analog signal which is mixed with the carrier signal to produce an RF reverse channel signal. Of course, up-converter 86 may use a two-step process that first converts to and IF frequency then to the final RF carrier. The RF reverse channel signal is broadcast from antenna 34. Although FIG. 2 shows subscriber unit 14 as having separate transmit and receive antennas 34, those skilled in the art will appreciate that a single antenna may suffice in many applications.

Figure 3:
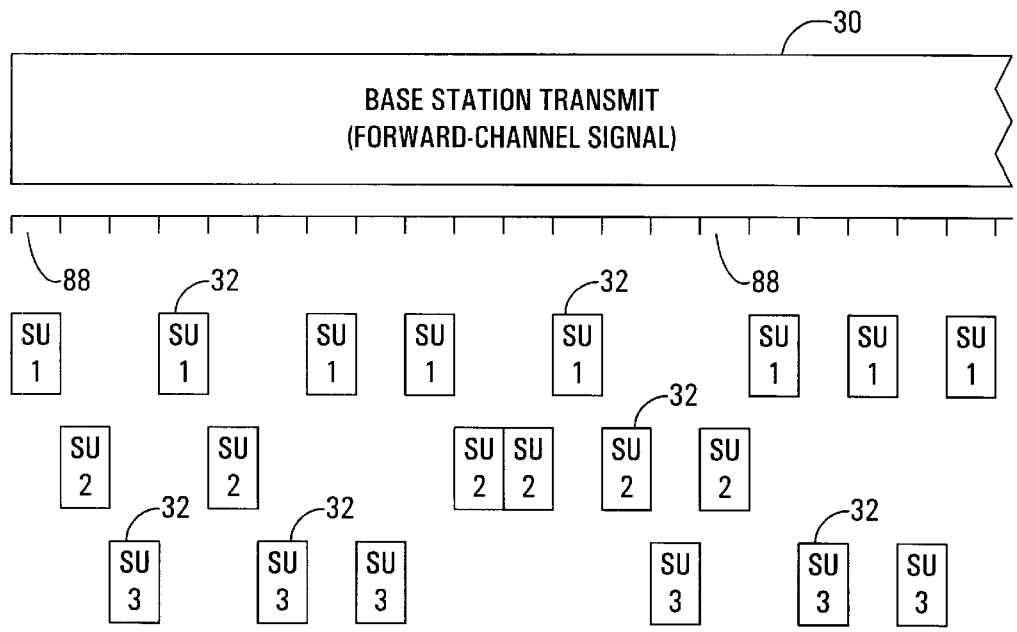
FIG. 3 is a timing diagram of bi-directional communications in the communication system shown in FIG. 2.

An exemplary timing relationship between the forward channel transmitted by base station 12 and the reverse channel transmitted by different subscriber units 14 is shown in FIG. 3. Referring to FIGS. 2–3, base station 12 transmits a continuous forward channel 30 to a group of subscriber units 14, and each subscriber unit 14 transmits short reverse channel 32 bursts according to their assigned timeslots 88. As soon as one subscriber unit 14 has ended its transmission, another subscriber unit 14 may begin transmitting.

The precise frequencies of reference frequency signals from subscriber unit oscillators 66 vary considerably among different subscriber units 14. These variations in frequency among subscriber units 14 are typically caused by differing oscillators 66. Desirably, low cost oscillators are used in subscriber units 14. Such low cost oscillators may exhibit poor accuracy and frequency drift. In addition, additional long-term drifting may result from temperature variations and life cycle component degradation.

The forward channel 30 characteristics of the preferred embodiment of this invention show base station 12 transmitting continuously to subscriber units 14. While continuous transmission on forward channel 30 is not a requirement, in the preferred embodiment the period of forward channel signal 30 substantially exceeds the period of any single reverse channel 32 burst.

Conventional synchronization techniques require overhead processing time for base station demodulator 64 (FIG. 2) to "lock on" to the subscriber unit transmitting frequency of reverse channel 32. If the signal-to-noise ratio is low or if there are excessive variations between the subscriber unit transmitting frequency and the base station receiving frequency, the overhead time spent achieving synchronization is time unavailable for conveying subscriber unit data. The base station receiving frequency may be understood as the frequency at which reverse channel 32 signals may be demodulated without first requiring significant frequency synchronization. Since there is constant and frequent switching of the reverse channel 32 between different subscriber units 14, synchronization time is desirably held to a minimum to use the allocated spectrum efficiently. Desirably, base station 12 synchronizes to a different subscriber unit 14 as soon as possible upon initiation of a new time slot 88.

Using conventional phase locked loop synchronization techniques, it is impractical to attempt a rapid synchronization at base station demodulator 64 because signal characteristics are too uncertain due to the inherent nature of burst mode signal characteristics to permit accurate frequency estimates based on small sample sizes. In other words, the short bursts do not convey enough information to resolve the uncertainties of the received signal and then convey a significant quantity of user data. Conventional coherent demodulation techniques require large sample sizes obtained by listening to received signals for an undesirably long time before useful data may be extracted. Certain differential demodulation techniques may permit rapid synchronization, but only at the price of up to a 3dB signal-to-noise ratio penalty for a given received signal.

In general, system 10 provides certain data to subscriber units 14 which allows subscriber units 14 to adjust their transmitting frequencies such that reverse channel 32 signals received by base station 12 from different subscriber units 14 are already frequency synchronized with base station demodulator 64. Thus, base station 12 need not perform significant time-consuming frequency synchronization tasks.

Figure 4:
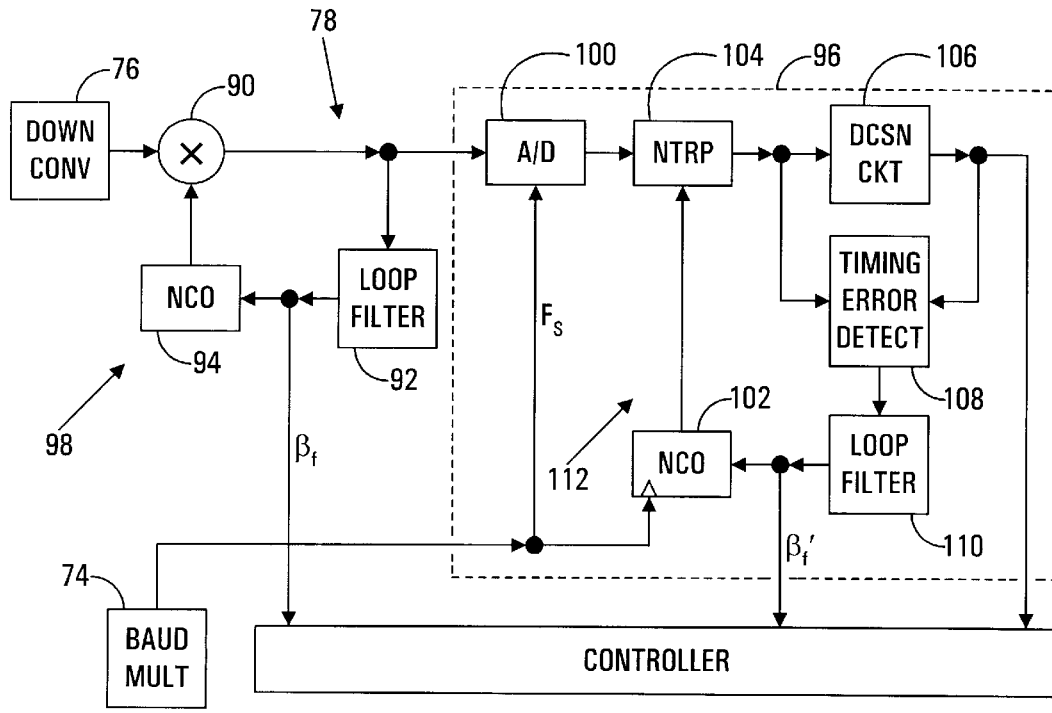
FIG. 4 is a block diagram of a demodulator portion of the subscriber unit included in the radio communication system in accordance with the present invention.

FIG. 4 shows a block diagram of demodulator 78 within receiver 36 of each subscriber unit 14. Demodulator 78 includes a phase comparator 90, a loop filter 92, a numeric controlled oscillator (NCO) 94 and a data detector 96. The output of down-converter 76 connects to a first input of phase comparator 90. The output of NCO 94 connects to a second input of phase comparator 90. The output of phase comparator 90 couples to an input of data detector 96 and to an input of loop filter 92. An output from loop filter 92 provides one of the coherence control signal outputs of demodulator 78 as previously described. The output from loop filter 92 also connects to an input of NCO 94.

Phase comparator 90, loop filter 92, and NCO 94 form a phase locked loop 98, which is a well-known circuit to those skilled in the art of digital demodulators and useful in achieving spectral coherence with a received signal. Although a single output is shown from down-converter 76 for the sake of simplicity, phase locked loop 98 in the preferred embodiment works in quadrature. As discussed in more detail below, phase locked loop 98 synchronizes demodulator 78 to the base station transmitting frequency of forward channel 30. The resulting subscriber unit receiving frequency, which precisely equals the base station transmitting frequency after synchronization, is the sum of the coarse carrier frequency defined by multiplier 70 (FIG. 2) and the frequency of a signal generated by NCO 94. The frequency of the signal generated by NCO 94 is characterized by the control signal output from loop filter 92. This control signal is referred to herein as beta-fine ($\beta_f$), and it serves as one of the coherence signals provided to controller 42 from demodulator 78.

When phase locked loop 98 has locked to the base station transmitting frequency of forward channel 30, the signal output by phase comparator 90 is a baseband signal. This baseband signal is sampled at an analog-to-digital (A/D) converter 100 of data detector 96. The sampling frequency $F_S$ provided by multiplier 74 is supplied to a clock input of A/D 100 and a clock input of an NCO 102. This stable frequency is desirably slightly greater (e.g. 1.1–1.6 times) than the expected baud rate demonstrated by forward channel 30.

An output of A/D 100 couples to a data input of an interpolator 104, and a control input of interpolator 104 is driven by an output from NCO 102. An output of interpolator (NTRP) 104 couples to an input of a decision (DCSN) circuit 106. An output of decision circuit 106 provides to controller 42 hard decisions of the data transmitted over forward channel 30. First and second inputs of a timing error detector 108 couple to the input and output of decision circuit 106, and an output of timing error detector 108 couples to an input of a loop filter 110. An output of loop filter 110 couples to a control input of NCO 102 and provides data which are proportional to the frequency of a baud clock signal generated by NCO 102.

Interpolator 104, decision circuit 106, timing error detector 108, loop filter 110, and NCO 102 together form a phase locked loop 112. Desirably, all components in phase locked loop 112 are digital components. Phase locked loop 112 synchronizes demodulator 78 to the transmit baud frequency of forward channel 30. The output signal from NCO 102 represents the ratio of the base station transmitting baud frequency as established by interpolator 104, referred to herein as $F_J$, to the sampling frequency $F_S$ (i.e. $F_J/F_S$). This output signal is characterized by the control signal output from loop filter 110. This control signal is referred to herein as beta-fine-prime ($\beta_c'$) and serves as another of the coherence signals provided to controller 42 from demodulator 78. The use of coherence signals $\beta_f$ and $\beta_c'$ in causing subscriber unit transmitting frequencies to be a priori-synchronized to the base station 12 receiving frequencies is discussed below in connection with FIG. 6.

Figure 5:
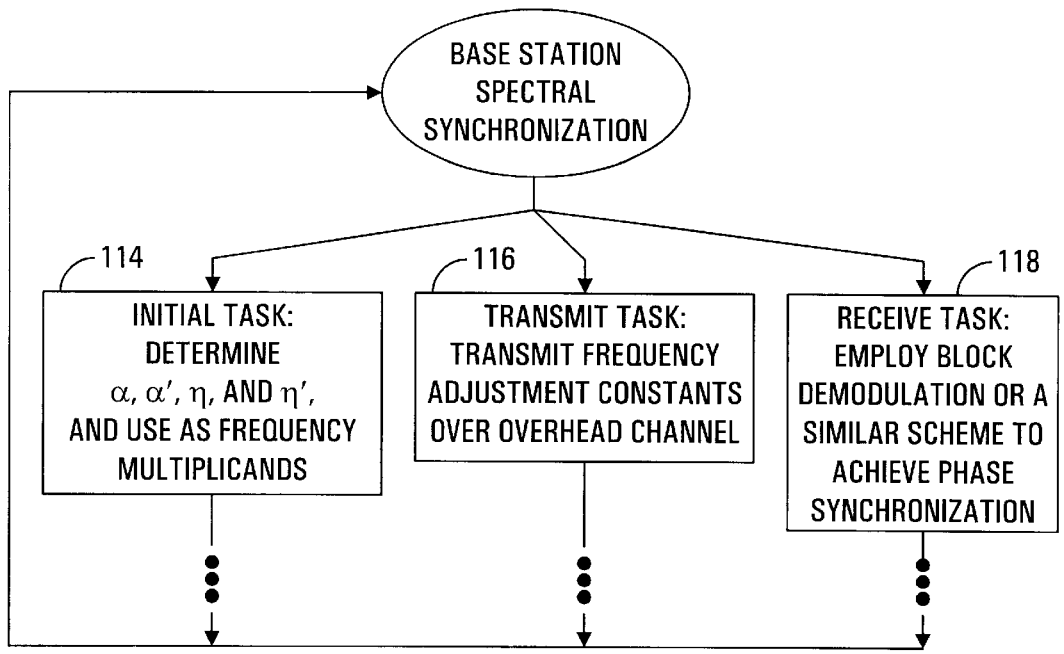
FIG. 5 is a flowchart of tasks performed by the communication system shown in FIG. 2 to achieve base station receiver synchronization.

FIG. 5 shows a chart of tasks performed by base station 12 to achieve spectral synchronization of demodulator 64 (FIG. 2) with reverse channel 32 from subscriber units 14. Prior to performing a transmit or receive operation, base station 12 performs an initial task 114. Task 114 calculates two constant values, alpha ($\alpha$) and eta ($\eta$), for use as carrier frequency multiplicands and two constant values alpha-prime ($\alpha'$) and eta-prime ($\eta'$), for use as baud frequency multiplicands. For purposes of the present discussion the prime indicators (') are omitted to indicate carrier multiplicands and to indicate baud and carrier multiplicands collectively.

Value $\alpha$ is applied to transmit carrier frequency multiplier 50 to define the transmitting carrier frequency of forward channel 30. Value $\eta$ is applied to receive carrier frequency multiplier 52 to define the carrier frequency at which reverse channel 32 may be demodulated without first requiring significant frequency synchronization. This frequency may be understood as the base station receiving carrier frequency. Value $\alpha'$ is applied to transmit baud frequency multiplier 54 to define the transmitting baud frequency of forward channel 30. Value $\eta'$ is applied to receive baud frequency multiplier 56 to define the frequency at which reverse channel 32 signals may be demodulated without first requiring significant baud frequency synchronization. This frequency may be understood as the base station receiving baud frequency.

After calculating and applying $\alpha$, $\eta$, $\alpha'$ and $\eta'$, base station controller 22 performs a task 116 to transmit frequency adjustment constants along with other data directed to subscriber units 14 over forward channel 30. The frequency adjustment constants in the preferred embodiment consists of both $\alpha$ and $\eta$ for carrier frequency adjustment purposes and both $\alpha'$ and $\eta'$ for baud frequency adjustment purposes. Controller 22 sends a digital data stream containing, in addition to the frequency adjustment constants, data directed to subscriber units 14. While the preferred embodiment transmits $\alpha$, $\eta$, $\alpha'$ and $\eta'$ during task 116, other embodiments may transmit other frequency constants based upon $\alpha$ and $\eta$ for carrier frequency adjustment purposes and based upon $\alpha'$ and η' for baud frequency adjustment purposes. Such other constants may be a ratio of the α and η values or other functions of the α and η values.

During the reverse channel receive operation, base station controller 22 performs a receive synchronizing task 118. Demodulator 64 will already be frequency synchronized, for the most part, to reverse channel 32 at the beginning of each reverse channel time slot 88 (see FIG. 4), and no data will be lost. However, reverse channel 32 will not necessarily be phase synchronized at the beginning of the reverse channel time slot 88. Block demodulation or a similar scheme familiar to those skilled in the art can be used to achieve phase synchronization at demodulator 64 without loss of data.

Those skilled in the art will appreciate that there are many other tasks performed by controller 22, as indicated by the ellipses shown in FIG. 5. Such tasks are not relevant to the preferred embodiment of the present invention.

Figure 6:
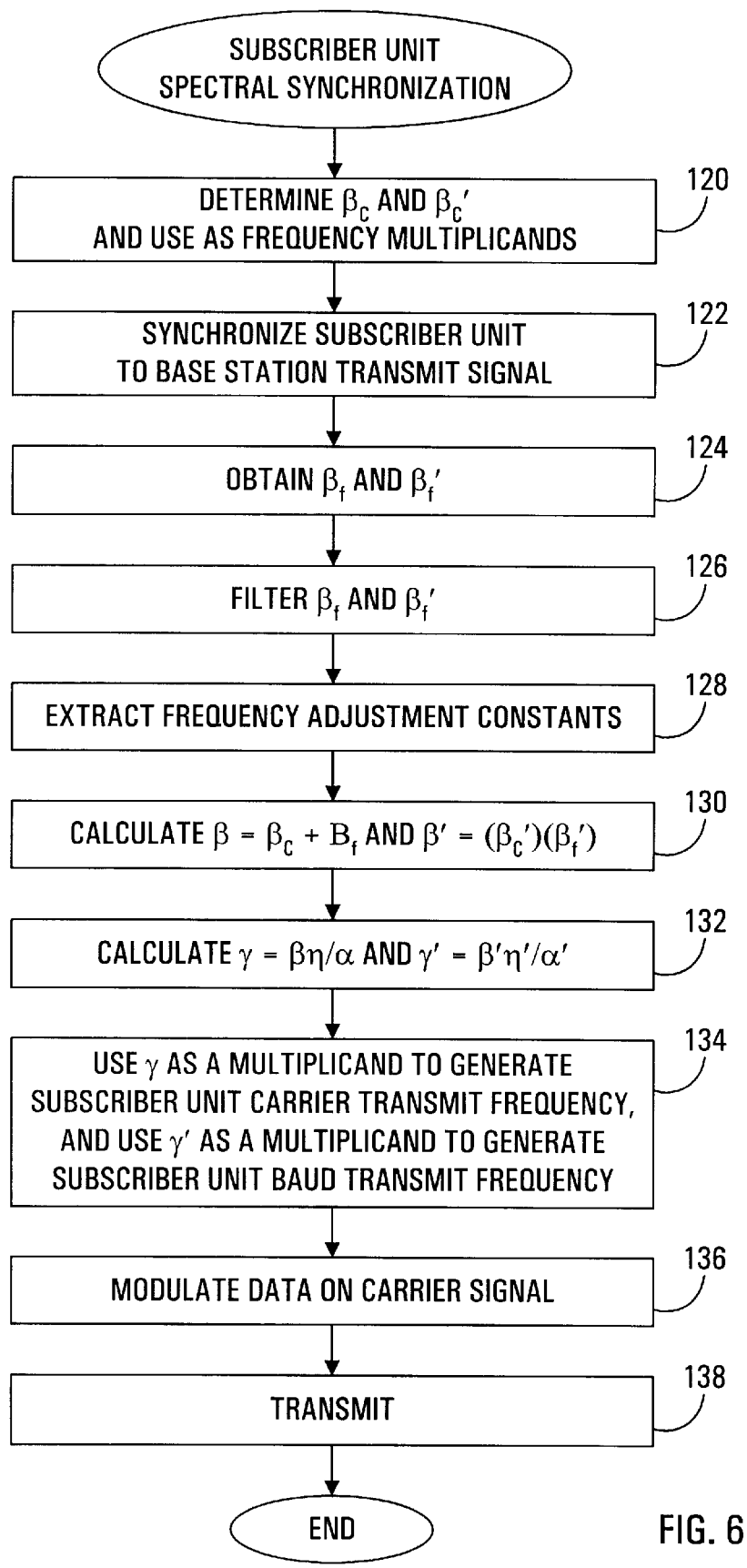
FIG. 6 is a flow chart of the tasks performed by the system shown in FIG. 2 to achieve rapid synchronization of a subscriber unit transmitting frequency to a base station receiving frequency.

FIG. 6 shows a flow chart of tasks that subscriber unit 14 performs so that its transmitted reverse channel 32 is a-priori frequency synchronized to base station demodulator 64. An initial task 120 for subscriber unit controller 42 provides coarse carrier frequency constant $\beta_c$ to receive carrier frequency multiplier 70 (FIG. 2) and coarse baud frequency constant $\beta_c'$ to receive baud frequency multiplier 74 (FIG. 2).

Coarse carrier constant $\beta_c$ is determined in response to the anticipated carrier frequency of forward channel 30 and the frequency of reference oscillator 66. Subscriber unit 14 converts the forward channel 30 signal to near-baseband using the subscriber unit reference frequency of oscillator 66 multiplied by constant $\beta_c$. Subscriber unit 14 has now achieved an extremely coarse synchronization with forward channel 30. The difference in frequency between the product of the subscriber unit reference frequency times $\beta_c$ and the actual received forward channel 30 is called the "offset" frequency or "frequency error constant" herein.

As indicated in a task 122, demodulator 78 synchronizes to the near-baseband form of forward channel 30. When demodulator 78 locks onto, or is synchronized with, the carrier frequency of forward channel 32, the following equation holds true: $\alpha f_{bs} = \beta f_{sref}$, where $f_{bs}$ is the base station reference frequency and $f_{sref}$ is the subscriber unit reference frequency. In other words, the product of α times the frequency ($f_{bs}$) of base station reference oscillator 48 equals the product of β times the frequency ($f_{sref}$) of subscriber unit reference oscillator 66. Phase locked loop 98 of demodulator 78 (FIG. 4) determines the value of the offset frequency simply by becoming locked to the near-baseband forward channel signal. Constant value $\beta_f$ generated by loop filter 92 characterizes this offset and is sent to controller 42 in a task 124.

Likewise, coarse baud constant $\beta_c'$ is determined in response to the anticipated baud frequency of the forward channel 30 signal and the frequency of reference oscillator 66. Subscriber unit 14 samples forward channel 30 at a sampling rate Fs equal to the subscriber unit reference frequency of oscillator 66 multiplied by constant $\beta_c'$. As discussed above, this sampling rate is desirably slightly greater than the expected baud rate. As further indicated in task 122, demodulator 78 synchronizes to the over-sampled form of the forward channel 30 signal. When demodulator 78 locks onto, or is synchronized with, the baud frequency F, of the forward channel 30 signal, the following equation holds true: $\alpha' f_{bs} = \beta' f_{sref}$. In other words, the product of α' times the frequency ($f_{bs}$) of base station reference oscillator 48 equals the product of β' times the frequency ($f_{sref}$) of subscriber unit reference oscillator 66. Phase locked loop 112 of demodulator 78 (FIG. 4) determines the value $F_t/F_S$ which, when multiplied by the sampling frequency $F_S$ equals the base station transmitting baud frequency to which demodulator 78 has become synchronized. Constant value $\beta_c'$ generated by loop filter 110 characterizes this ratio, which is also sent to controller 42 in task 124.

The subscriber unit carrier β equals the sum of $\beta_c$ and $\beta_f$, or $\beta = \beta_c + \beta_f$. However, an instantaneous value of $\beta_f$ or β may be too error prone without filtering. Accordingly, digital filtering and/or statistical averaging of $\beta_f$ is performed by controller 42 during a task 126.

Similarly, the subscriber unit baud constant β' equals the product of $\beta_c'$ and $\beta_f'$, or $\beta' = (\beta_c')(\beta_f')$. While $\beta_c'$ is a constant value, $\beta_f'$ is continuously being adjusted through the operation of phase locked loop 112 to track both phase and frequency errors between loop 112 and forward channel 30. Accordingly, digital filtering and/or statistical averaging of $\beta_f'$ is also performed by controller 42 during a task 126. This additional filtering removes the phase content of $\beta_f'$ while producing a stable representation of the frequency content.

Once carrier frequency and baud frequency synchronization occurs, subscriber unit demodulator 78 can successfully extract data from the digital data stream transmitted by base station 12 in forward channel 30. Data from demodulator 78 is delivered to controller 42 for processing. The digital data stream contains overhead channel information such as call setup parameters, modulation order, time slot block allocations, and timing offsets as well as data comprising the subscriber unit message and the above-discussed frequency adjustment constants.

During a task 128 frequency adjustment constants α, η, α' and η' are extracted from the incoming digital data stream by demodulator 78 and presented to controller 42 along with other data conveyed by forward channel 30. Controller 42 then calculates the subscriber unit receiving carrier frequency value β using values $\beta_f$ and $\beta_c$ and receiving baud frequency value β' using $\beta_c'$ and $\beta_c'$ during a task 130.

Once subscriber unit controller 42 has received the α and η values and calculated the β values, it performs a task 132, in which it calculates frequency constant values gamma (γ) and gamma-prime (γ'). To assure a substantial match of the subscriber unit transmitting carrier frequency to the base station receiving carrier frequency, γ should equal the product of the ratio of β to α multiplied by η, or $\gamma = \beta\eta/\alpha$. Likewise, to assure a substantial match of the subscriber unit transmitting baud frequency to the base station receiving baud frequency, γ' should equal the product of the ratio of β' to α' multiplied by η', or $\gamma' = \beta'\eta'/\alpha'$.

During a task 134, controller 42 respectively supplies γ and γ' to multipliers 68 and 72 so that the subscriber unit reference frequency is multiplied by γ and γ' to arrive at the carrier and baud frequencies for which base station demodulator 64 is already synchronized.

During a task 136 controller 42 supplies data which transmitter 38 modulates onto the carrier signal. The carrier signal "carries" information when it has been modulated. The subscriber unit carrier signal is supplied by transmit carrier frequency multiplier 68. During a task 138 the output of transmitter 38 is transmitted from antenna 34 as reverse channel 32. When the data for the current time slot 88 has been transmitted to base station 12, transmit operation 138 terminates.

Referring back to task 134, since the value γ that controls the subscriber unit transmit carrier frequency is proportional to both β and η but inversely proportional to only α, γ may exhibit a large value. In one embodiment, γ can exhibit values of several thousand. Accordingly, transmit carrier frequency multiplier 68 is implemented so that the subscriber unit reference frequency can be accurately multiplied by this large value of γ without encountering an excessive amount of phase noise. One desirable implementation for multiplier 68 is illustrated in block diagram form in FIG. 7.

Figure 7:
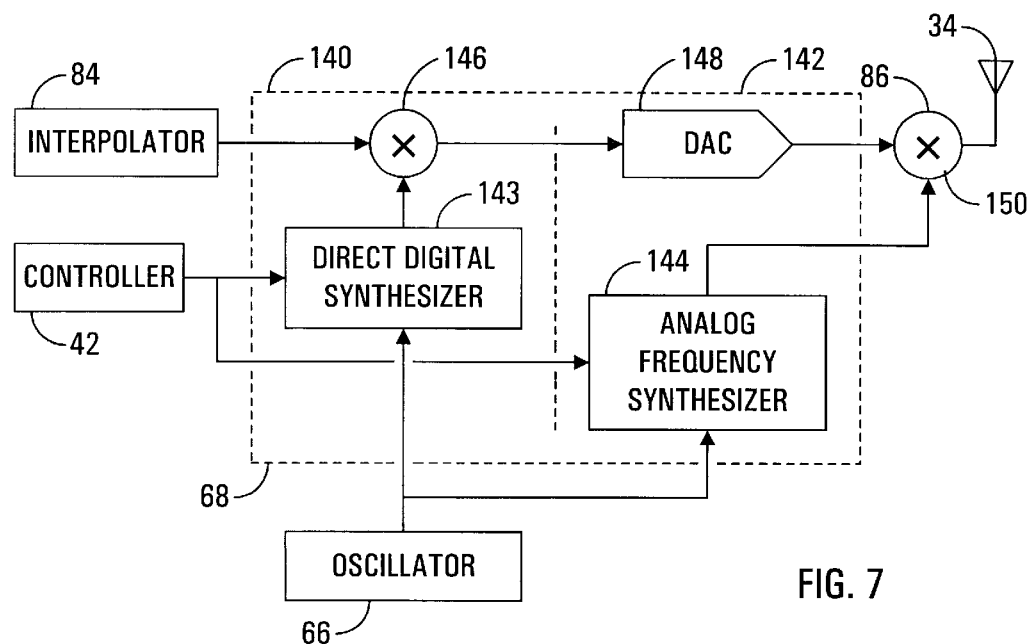
FIG. 7 shows a block diagram of a multiplier circuit used in the subscriber unit in accordance with a preferred embodiment of the present invention.

FIG. 7 illustrates multiplier 68 as being partitioned into a digital component section 140 and an analog component section 142. Digital section 140 includes a full complex direct digital synthesizer 143 which digitally synthesizes a complex oscillating signal having a frequency controlled by a digital input received from controller 42. Synthesizer 143 and an analog synthesizer 144 included in analog component section 142 may each be driven by the reference frequency of oscillator 66 or signals coherent with this reference frequency.

Desirably, synthesizer 143 is configured to operate over a relatively small frequency range and a relatively small frequency step size. For example, synthesizer 143 can be configured to operate over a range of 0–1 MHz in steps of 1 Hz or less. An output of synthesizer 143 couples to a full complex digital multiplier circuit 146 that additionally receives data to be modulated from interpolator 84. As a result of multiplier 146 and synthesizer 143, data is digitally modulated to a digital "intermediate" frequency, which is expressed as a complex digital data stream.

The complex digital data stream output from digital multiplier 146 is supplied to analog component section 142 of multiplier 68. In particular, the data stream is supplied to an input of a digital to analog converter (DAC) 148, where it is converted into an analog IF signal. The analog IF signal and a frequency reference signal from analog synthesizer 144 are both supplied to an analog mixer 150 of up-converter circuit 86.

Desirably, analog synthesizer 144 is configured to operate over a relatively large frequency range and a relatively large frequency step size, compared to digital synthesizer 143. For example, synthesizer 144 may be configured to operate over a range of 0–1 GHz in steps of 0.9 MHz. The precise frequency of operation, exhibited to a precision determined by the frequency step size of synthesizer 144, is determined by data supplied by controller 42.

Accordingly, multiplier 68 uses a two stage digital and analog synthesis process to multiply the subscriber unit reference frequency of oscillator 66 by the value of γ. A least significant portion of γ is supplied to and controls the frequency of the signal generated by digital synthesizer 143. A most significant portion of γ is supplied to and controls the frequency of the signal generated by analog synthesizer 144. The result represents the sum of these two frequencies. Substantially no phase noise is associated with the digital intermediate frequency data stream due to the small step size of synthesizer 143 and its digital implementation. Very little phase noise is associated with the oscillation signal generated by analog synthesizer 144 because, while the signal may vary over a large range, it has a large step size. The large step size permits the use of a higher frequency reference signal by analog synthesizer 144, which leads to reduced phase noise.

In summary, the present invention provides an improved method and apparatus for achieving rapid frequency synchronization in a communication system. Reverse channels are temporally and spectrally coherent with forward channels to reduce overhead communications. Reverse channels transmit at a carrier and baud frequency to which the base station demodulator is already frequency synchronized.

The present invention has been described above with reference to preferred embodiments. However, those skilled in the art will recognize that changes and modifications may be made in these preferred embodiments without departing from the scope of the present invention. Those skilled in the art will appreciate that processes performed at base stations and at subscriber units may classify and sequence tasks differently than discussed herein while achieving equivalent results. These and other changes and modifications which are obvious to those skilled in the art are intended to be included within the scope of the present invention.

What is claimed is:

1. A method for rapid frequency synchronization of a reverse channel signal to a base station receiving frequency which is proportional to η times a base station reference frequency, where η is a first value, said method comprising the steps of:

transmitting a forward channel signal from a base station, said forward channel signal exhibiting a base station transmitting frequency which is proportional to α times said base station reference frequency, where α is a second value;

calculating, at said subscriber unit, a frequency multiplicand which is proportional to η and inversely proportional to α;

generating a subscriber unit transmitting frequency in response to said frequency multiplicand; and transmitting said reverse channel signal from said subscriber unit, said reverse channel signal exhibiting said subscriber unit transmitting frequency.

2. A method as claimed in claim 1 additionally comprising the steps of:

configuring said forward channel signal to convey frequency adjustment data which are responsive to said base station receiving frequency and to said base station transmitting frequency; and extracting said frequency adjustment data from said forward channel signal prior to said calculating step.

3. A method is claimed in claim 1 wherein:

said forward channel transmitting step continuously transmits said forward channel signal for a first predetermined duration; and said reverse channel transmitting step continuously transmits said reverse channel signal for a second predetermined duration, said second predetermined duration being shorter than said first predetermined duration.

4. A method as claimed in claim 1 wherein a subscriber unit receiving frequency and said subscriber unit transmitting frequency are each responsive to a subscriber unit reference frequency.

5. A method as claimed in claim 4 additionally comprising the step of synchronizing said subscriber unit receiving frequency to said base station transmitting frequency.

6. A method as claimed in claim 4 wherein:

said subscriber unit receiving frequency is proportional to β times said subscriber unit reference frequency, where β is a third value; and said calculating step comprises the step of making said multiplicand proportional to β.

7. A method as claimed in claim 6 wherein said generating step comprises the step of multiplying (68) said subscriber unit reference frequency by said multiplicand.

8. A method as claimed in claim 7 wherein said multiplying step comprises the steps of:

synthesizing a first signal at a first frequency determined in response to a first portion of said multiplicand, said first frequency being adjustable in first frequency steps over a first frequency adjustment range; and producing a second signal at a second frequency determined in response to said frequency of said first signal and a second portion of said multiplicand, said second frequency being adjustable in second frequency steps which are larger than said first frequency steps over a second frequency adjustment range which is larger than said first frequency adjustment range.

9. A method as claimed in claim 8 wherein:

said synthesizing step is performed in digital components; and said producing step is performed in analog components.

10. A method as claimed in claim 1 wherein said generating step generates a baud clock signal oscillating at said subscriber unit transmitting frequency.

11. A method as claimed in claim 1 wherein said generating step generates a carrier signal oscillating at said subscriber unit transmitting frequency.

12. A method as claimed in claim 1 wherein:

said base station receiving frequency is a carrier frequency, said base station transmitting frequency is a carrier frequency, said base station reference frequency is a carrier reference frequency, said frequency multiplicand is a carrier frequency multiplicand, and subscriber unit transmitting frequency is a carrier frequency;

a base station receiving baud frequency is proportional to $\eta'$ times a base station baud reference frequency, where $\eta'$ is a third value;

a base station transmitting baud frequency is proportional to $\alpha'$ times said base station baud reference frequency, where $\alpha'$ is a fourth value;

said forward channel signal exhibits said base station transmitting carrier frequency and said base station transmitting baud frequency;

said method additionally comprises the step of calculating, at said subscriber unit, a baud frequency multiplicand which is proportional to $\eta'$ and inversely proportional to $\alpha'$;

said method additionally comprises the step of generating a subscriber unit transmitting baud frequency in response to said baud frequency multiplicand; and said reverse channel signal exhibits said subscriber unit transmitting carrier frequency and said subscriber unit transmitting baud frequency.

13. A method as claimed in claim 1 wherein said base station and said subscriber unit are substantially stationary relative to each other.

14. A method as claimed in claim 1 wherein:

said subscriber unit is one of a plurality of subscriber units;

each of said plurality of subscriber units performs said calculating, generating and transmitting steps;

said calculating step performed at each of said plurality of subscriber units calculates frequency multiplicands which are different for each of said plurality of subscriber units; and said generating step performed in each of said plurality of subscriber units generates substantially equal subscriber unit transmitting frequencies.

15. In an RF digital communication system in which a base station rapidly synchronizes a reverse channel signal to a base station receiving frequency that is proportional to $\eta$ (eta) times a base station reference frequency, where $\eta$ is a first value, and in which said base station transmits a forward channel signal that exhibits a base station transmitting frequency which is proportional to $\alpha$ (alpha) times said base station reference frequency, where $\alpha$ is a second value, an RF digital communication subscriber unit comprising:

a demodulator configured to synchronize a subscriber unit receiving frequency to said base station transmitting frequency and generate error data which are responsive to both said subscriber unit receiving frequency and a subscriber unit reference frequency;

a controller coupled to said demodulator, said controller being configured to calculate a frequency multiplicand which is proportional to $\eta$, inversely proportional to $\alpha$, and responsive to said error data;

a frequency multiplier circuit coupled to said controller to multiply said subscriber unit reference frequency by said frequency multiplicand; and an RF circuit coupled to said frequency multiplier circuit and configured to generate said reverse channel signal, said reverse channel signal exhibiting said subscriber unit transmitting frequency.

16. An RF digital communication subscriber unit as claimed in claim 15 wherein:

said base station is configured so that said forward channel signal conveys frequency adjustment data which are responsive to said base station receiving frequency and to said base station transmitting frequency; and said controller is configured so that said frequency multiplicand is responsive to said frequency adjustment data.

17. An RF digital communication subscriber unit as claimed in claim 15 wherein:

said subscriber unit receiving frequency is proportional to $\beta$ (beta) times said subscriber unit reference frequency, where $\beta$ is a third value;

said third value $\beta$ equals $\beta_c$ (beta-coarse) plus $\beta_f$ (beta-fine), where $\beta_f$ is a fourth value that is characterized by said error data and where $\beta_c$ is a fifth value;

said subscriber unit additionally comprises a second frequency multiplier circuit in which said subscriber unit receiving frequency is multiplied by $\beta_c$, said second frequency multiplier circuit being coupled to said demodulator; and said controller is configured so that said frequency multiplicand is additionally proportional to $\beta$.

18. An RF digital communication subscriber unit as claimed in claim 15 wherein said frequency multiplier circuit comprises:

a digital frequency synthesizer configured to synthesize a first signal at a first frequency determined in response to a first portion of said frequency multiplicand, said first frequency being adjustable in first frequency steps over a first frequency adjustment range; and an analog frequency synthesizer configured to produce a second signal at a second frequency determined in response to said frequency of said first signal and a second portion of said multiplicand, said second frequency being adjustable in second frequency steps which are larger than said first frequency steps over a second frequency adjustment range which is larger than said first frequency adjustment range.

19. An RF digital communication subscriber unit as claimed in claim 15 wherein said frequency multiplier circuit generates a baud clock signal oscillating at said subscriber unit transmitting frequency.

20. An RF digital communication subscriber unit as claimed in claim 15 wherein said frequency multiplier circuit generates a carrier signal oscillating at said subscriber unit transmitting frequency.

21. An RF digital communication subscriber unit as claimed in claim 15 wherein:

said base station receiving frequency is a carrier frequency, said base station transmitting frequency is a carrier frequency, said base station reference frequency is a carrier reference frequency, said frequency multiplicand is a carrier frequency multiplicand, and said subscriber unit transmitting frequency is a carrier frequency;

a base station receiving baud frequency is proportional to $\eta'$ times a base station baud reference frequency, where $\eta'$ is a third value;

a base station transmitting baud frequency is proportional to $\alpha'$ times said base station baud reference frequency, where $\alpha'$ is a fourth value;

said forward channel signal exhibits said base station transmitting carrier frequency and said base station transmitting baud frequency;

said controller is additionally configured to calculate a baud frequency multiplicand which is proportional to $\eta'$ and inversely proportional to $\alpha'$;

said subscriber unit additionally comprises a second frequency multiplier circuit coupled to said controller and said RF circuit to multiply said subscriber unit reference frequency by said baud frequency multiplicand; and said RF circuit is configured so that said reverse channel signal exhibits said subscriber unit transmitting carrier frequency and said subscriber unit transmitting baud frequency.

22. A method for rapid synchronization of a subscriber unit transmitting frequency to a base station receiving frequency which is proportional to $\eta$ times a base station reference frequency, where $\eta$ is a first value, said method comprising the steps of:

causing said base station receiving frequency and a base station transmitting frequency to be responsive to a base station reference frequency, said base station transmitting frequency being proportional to $\alpha$ times said base station reference frequency, where $\alpha$ is a second value;

causing a subscriber unit receiving frequency and said subscriber unit transmitting frequency to be responsive to a subscriber unit reference frequency, said subscriber unit receiving frequency being proportional to $\beta$ times said subscriber unit reference frequency, where $\beta$ is a third value;

synchronizing said subscriber unit receiving frequency to said base station transmitting frequency; calculating, at said subscriber unit, a radio frequency multiplier which is proportional to $\eta$ and to $\beta$ and inversely proportional to $\alpha$; and generating said subscriber unit transmitting frequency in response to said radio frequency multiplier and said subscriber unit reference frequency.

23. An RF digital communication system comprising:

a base station having an oscillator which establishes a base station reference frequency, a receiver configured to receive a reverse channel signal at a base station receiving frequency which is proportional to $\eta$ (eta) times said base station reference frequency, a transmitter configured to transmit a forward channel signal exhibiting a base station transmitting frequency which is proportional to $\alpha$ (alpha) times said base station reference frequency, said forward channel signal conveying frequency adjustment data which are responsive to said base station receiving frequency and to said base station transmitting frequency;

a first subscriber unit configured to extract said frequency adjustment data from said forward channel signal, to calculate a first frequency multiplicand which is proportional to $\eta$ and inversely proportional to $\alpha$, to generate a subscriber unit transmitting frequency in response to said first frequency multiplicand, and to transmit a first portion of said reverse channel signal at substantially said subscriber unit transmitting frequency; and a second subscriber unit configured to extract said frequency adjustment data from said forward channel signal, to calculate a second frequency multiplicand which is proportional to $\eta$ and inversely proportional to $\alpha$, to generate substantially said subscriber unit transmitting frequency in response to said second frequency multiplicand, and to transmit a second portion of said reverse channel signal at substantially said subscriber unit transmitting frequency.

24. An RF digital communication system as claimed in claim 23 wherein:

said first subscriber unit includes a first oscillator oscillating at a first subscriber unit reference frequency;

said second subscriber unit includes a second oscillator oscillating at a second subscriber unit reference frequency, said second subscriber unit reference frequency differing from said first subscriber unit reference frequency; and said first and second multiplicands differing from one another to compensate for differences between said first and second subscriber unit reference frequencies.

* * * * *

UNITED STATES PATENT AND TRADEMARK OFFICE
CERTIFICATE OF CORRECTION

PATENT NO. : 6,041,088
DATED : March 21, 2000
INVENTOR(S) : Ronald D. McCallister It is certified that error appears in the above-identified patent and that said Letters Patent is hereby corrected as shown below:

In Column 10, Lines 23 and 25, Column 12 Lines 7 and in Line 40, first occurrence please replace "$\beta_c{}'$" with --$\beta_f{}'$--.

In Column 11, Line 65 please replace "F" with --$F_1$--.

Signed and Sealed this

Thirteenth Day of February, 2001

Attest:

NICHOLAS P. GODICI

*Attesting Officer*  *Acting Director of the United States Patent and Trademark Office*